United States Patent
Abotabl et al.

(10) Patent No.: US 11,664,962 B2
(45) Date of Patent: May 30, 2023

(54) SIGNALING TIME DIVISION DUPLEXING PATTERN AND SLOT FORMAT INDICATOR FOR NEIGHBORING CELL

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/185,724

(22) Filed: Feb. 25, 2021

(65) Prior Publication Data

US 2022/0271909 A1     Aug. 25, 2022

(51) Int. Cl.
*H04L 5/14*      (2006.01)
*H04W 72/23*     (2023.01)

(52) U.S. Cl.
CPC ............... *H04L 5/14* (2013.01); *H04W 72/23* (2023.01)

(58) Field of Classification Search
CPC ............ H04W 72/0446; H04W 72/042; H04L 5/0005; H04L 5/0053; H04L 5/0091; H04L 5/1469; H04L 5/0007; H04L 5/14
See application file for complete search history.

(56) References Cited

U.S. PATENT DOCUMENTS

| | | | |
|---|---|---|---|
| 2018/0376476 A1 | 12/2018 | Lee et al. | |
| 2019/0174487 A1* | 6/2019 | Sun | H04L 5/1469 |
| 2021/0204172 A1* | 7/2021 | Rost | H04L 41/5009 |
| 2022/0030591 A1* | 1/2022 | Takeda | H04W 72/042 |
| 2022/0110136 A1* | 4/2022 | Li | H04W 72/1231 |

FOREIGN PATENT DOCUMENTS

| | | |
|---|---|---|
| WO | 2019221567 A1 | 11/2019 |
| WO | 2020204526 A1 | 10/2020 |

OTHER PUBLICATIONS

International Search Report and Written Opinion—PCT/US2022/070652—ISA/EPO—dated May 20, 2022.

* cited by examiner

*Primary Examiner* — Dady Chery
(74) *Attorney, Agent, or Firm* — Qualcomm Incorporated

(57) ABSTRACT

Various aspects of the present disclosure generally relate to wireless communication. In some aspects, a user equipment (UE) may receive, from a serving cell, first signaling that includes one or more time division duplexing (TDD) patterns associated with a neighboring cell. The UE may receive second signaling that includes a slot format indicator (SFI) associated with the neighboring cell. The UE may determine a slot configuration allocating transmission time intervals (TTIs) in the neighboring cell to one or more of downlink communication or uplink communication based at least in part on the one or more TDD patterns associated with the neighboring cell and the SFI associated with the neighboring cell. Numerous other aspects are described.

30 Claims, 10 Drawing Sheets

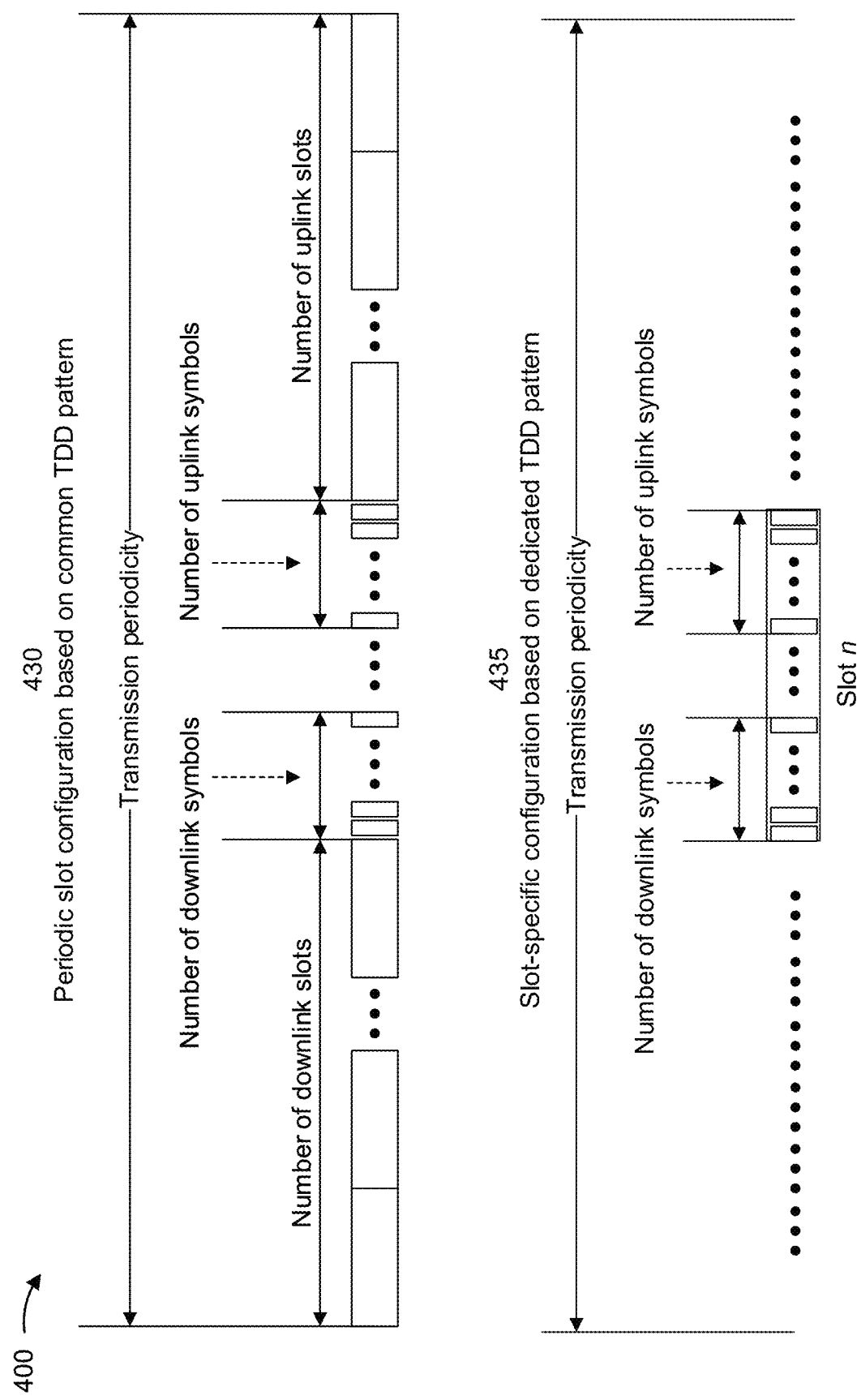

SIGNALING TIME DIVISION DUPLEXING PATTERN AND SLOT FORMAT INDICATOR FOR NEIGHBORING CELL

FIELD OF THE DISCLOSURE

Aspects of the present disclosure generally relate to wireless communication and to techniques and apparatuses for signaling a time division duplexing (TDD) pattern and slot format indicator (SFI) for a neighboring cell.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a serving cell, first signaling that includes one or more time division duplexing (TDD) patterns associated with a neighboring cell; receiving second signaling that includes a slot format indicator (SFI) associated with the neighboring cell; and determining a slot configuration allocating transmission time intervals (TTIs) in the neighboring cell to one or more of downlink communication or uplink communication based at least in part on the one or more TDD patterns associated with the neighboring cell and the SFI associated with the neighboring cell.

In some aspects, a UE for wireless communication includes a memory; and one or more processors, operatively coupled to the memory, configured to: receive, from a serving cell, first signaling that includes one or more TDD patterns associated with a neighboring cell; receive second signaling that includes an SFI associated with the neighboring cell; and determine a slot configuration allocating TTIs in the neighboring cell to one or more of downlink communication or uplink communication based at least in part on the one or more TDD patterns associated with the neighboring cell and the SFI associated with the neighboring cell.

In some aspects, a non-transitory computer-readable medium storing a set of instructions for wireless communication includes one or more instructions that, when executed by one or more processors of a UE, cause the UE to: receive, from a serving cell, first signaling that includes one or more TDD patterns associated with a neighboring cell; receive second signaling that includes an SFI associated with the neighboring cell; and determine a slot configuration allocating TTIs in the neighboring cell to one or more of downlink communication or uplink communication based at least in part on the one or more TDD patterns associated with the neighboring cell and the SFI associated with the neighboring cell.

In some aspects, an apparatus for wireless communication includes means for receiving, from a serving cell, first signaling that includes one or more TDD patterns associated with a neighboring cell; means for receiving second signaling that includes an SFI associated with the neighboring cell; and means for determining a slot configuration allocating TTIs in the neighboring cell to one or more of downlink communication or uplink communication based at least in part on the one or more TDD patterns associated with the neighboring cell and the SFI associated with the neighboring cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4C are diagrams illustrating examples of configuring transmission time intervals for downlink and/or uplink communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
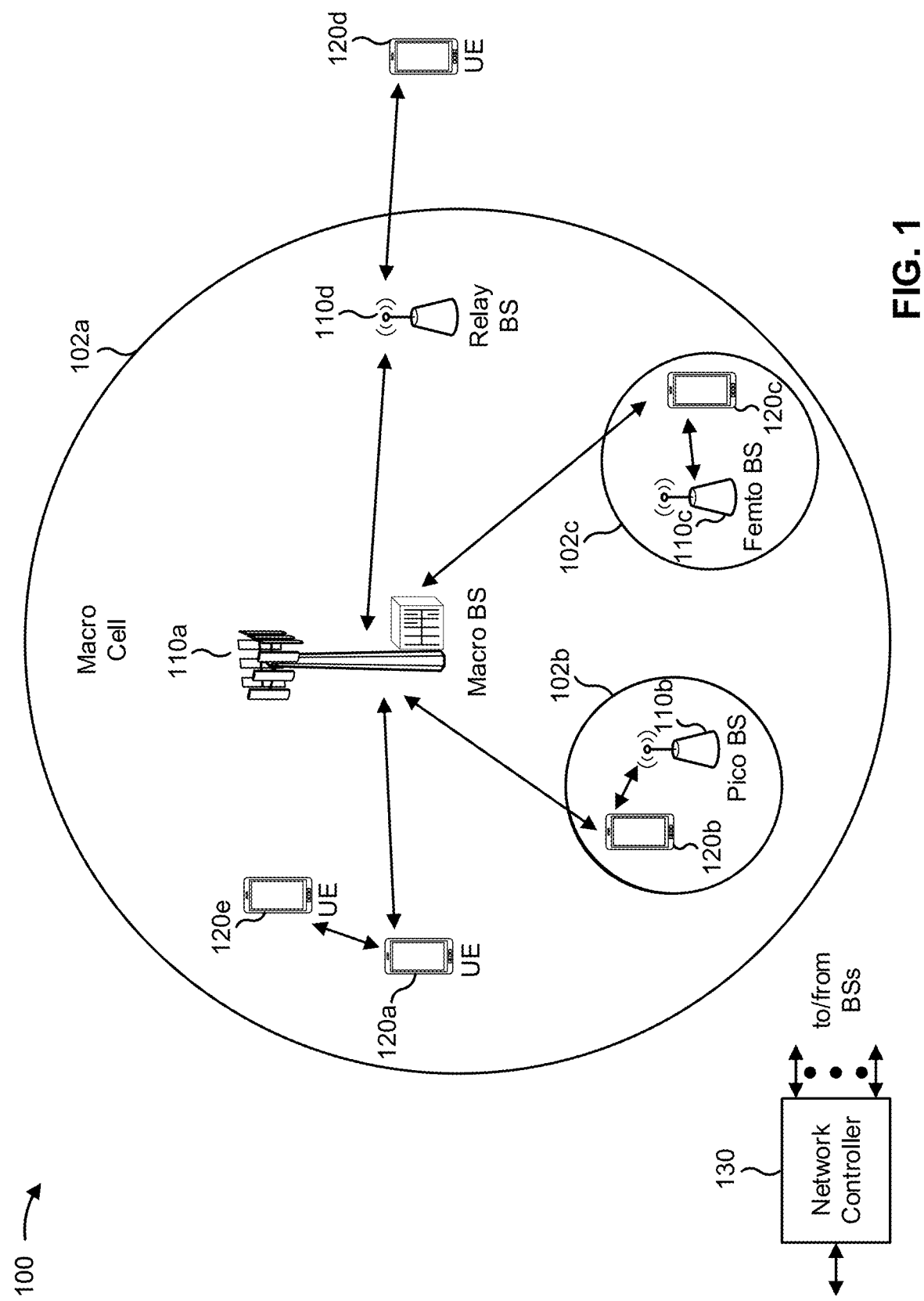
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG.

1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
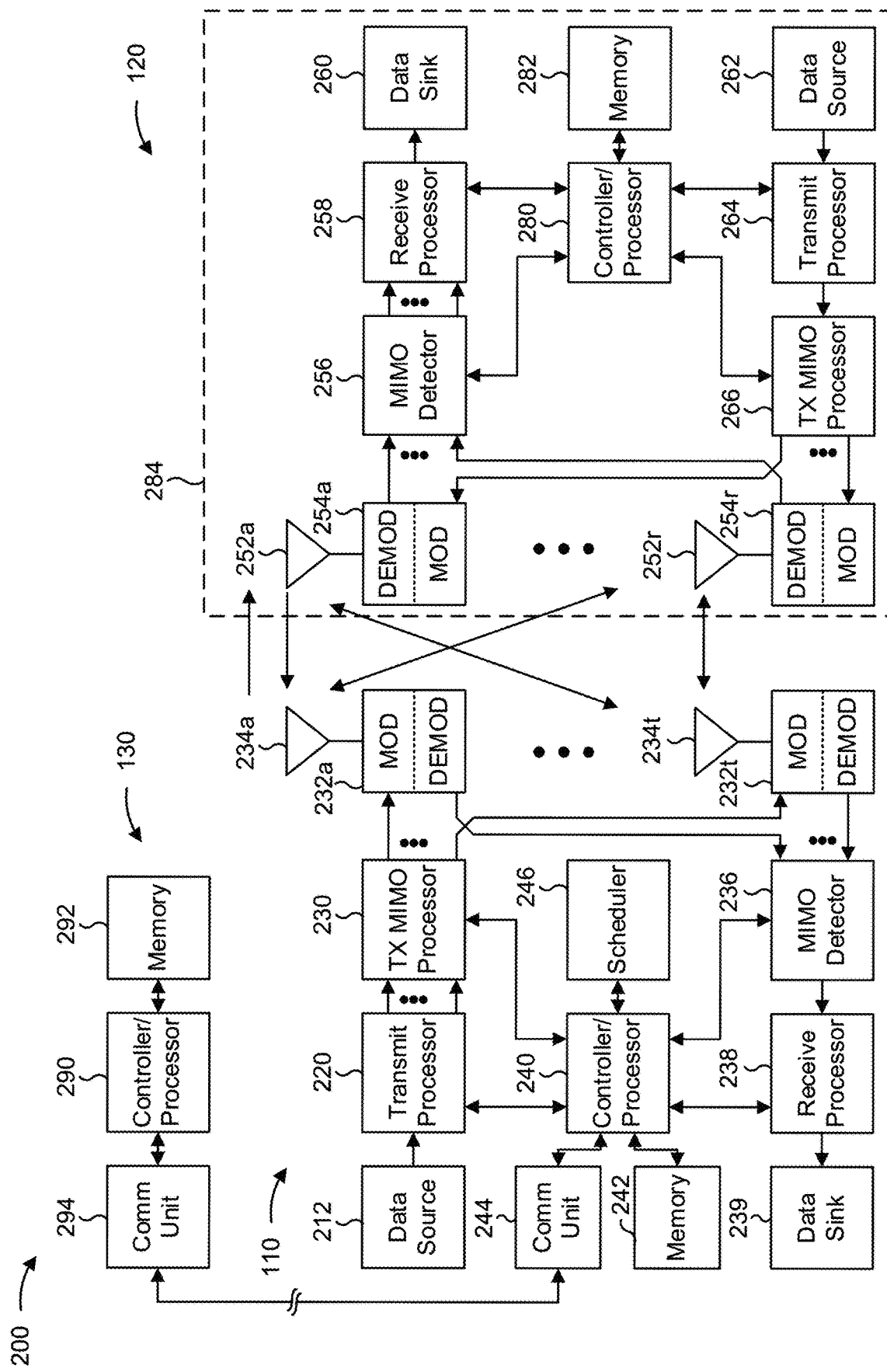
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-6.

Controller/processor 240 of base station 110, controller/processor 280 of UE 120, and/or any other component(s) of FIG. 2 may perform one or more techniques associated with signaling a time division duplexing (TDD) pattern and slot format indicator (SFI) for a neighboring cell, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, the UE 120 includes means for receiving, from a serving cell, first signaling that includes one or more TDD patterns associated with a neighboring cell; means for receiving second signaling that includes an SFI associated with the neighboring cell; and/or means for determining a slot configuration allocating transmission time intervals (TTIs) in the neighboring cell to one or more of downlink communication or uplink communication based at least in part on the one or more TDD patterns associated with the neighboring cell and the SFI associated with the neighboring cell. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for determining a location of the SFI associated with the neighboring cell within the DCI based at least in part on a parameter that indicates, within DCI transmitted by the serving cell, a starting bit position for the SFI associated with the serving cell.

In some aspects, the UE 120 includes means for determining, within the DCI, a location of an SFI field that includes the SFI associated with the serving cell and the SFI associated with the neighboring cell based at least in part on a parameter that indicates, within DCI transmitted by the serving cell, the location of the SFI field that includes the SFI associated with the serving cell.

In some aspects, the UE 120 includes means for determining a parameter that indicates a starting bit position for the SFI associated with the neighboring cell based at least in part on a cell identifier associated with the neighboring cell; and/or means for determining, within the DCI, a location of an SFI field dedicated to the SFI associated with the neighboring cell based at least in part on the parameter that indicates the starting bit position for the SFI associated with the neighboring cell.

In some aspects, the UE 120 includes means for receiving, from the serving cell, configuration information for the DCI; and/or means for decoding the DCI based at least in part on the configuration information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
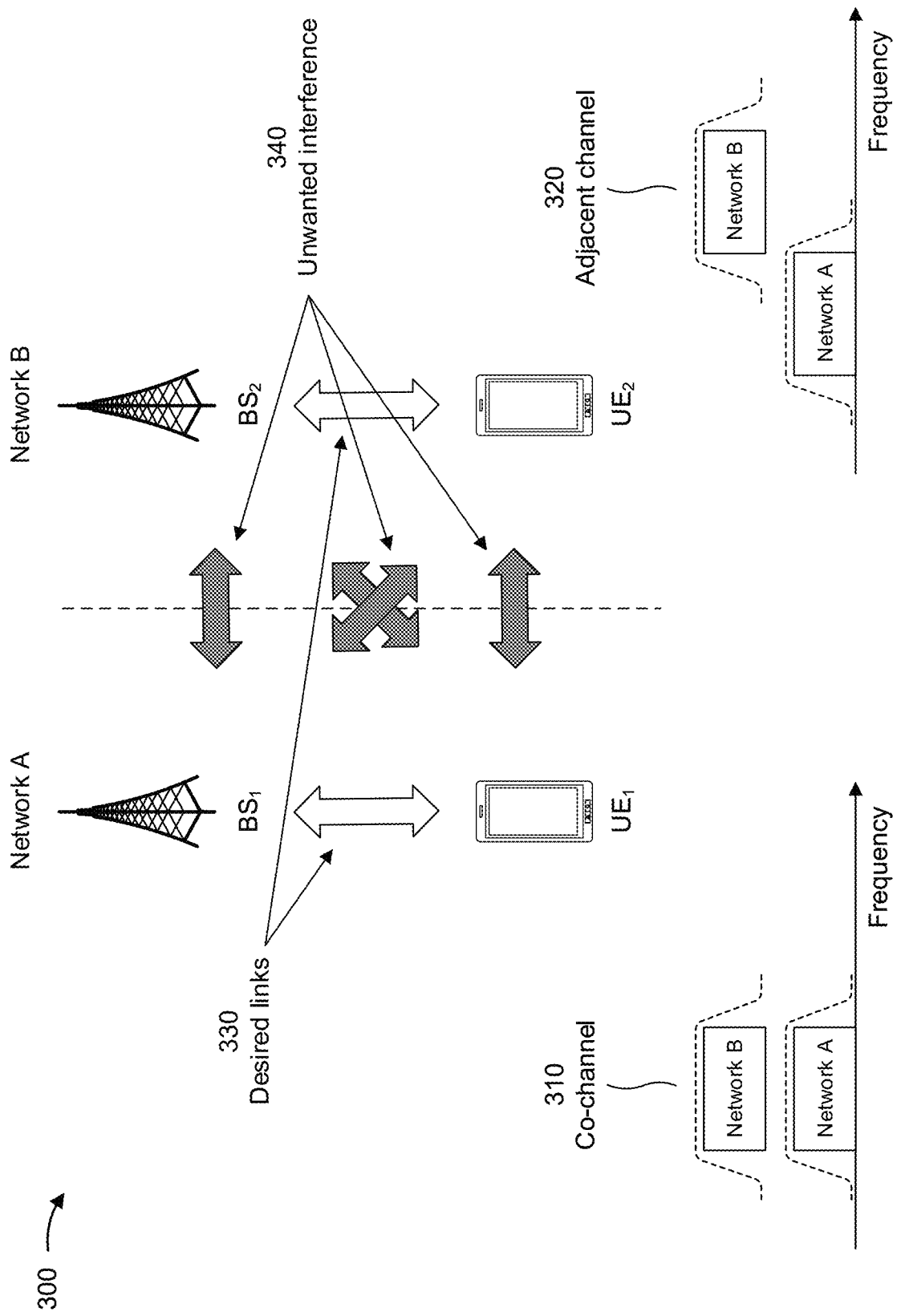
FIG. 3 is a diagram illustrating an example of detecting and mitigating cross-link interference, in accordance with the present disclosure.

FIG. 3 is a diagram illustrating an example 300 of detecting and mitigating cross-link interference, in accordance with the present disclosure. In dynamic time division duplexing (TDD), the allocation of network resources to uplink and downlink may be dynamically modified depending on a traffic load. For example, a base station may configure a TDD pattern with more uplink transmission time intervals (TTIs) (e.g., frames, subframes, slots, mini-slots, and/or symbols) when a served UE has uplink data to transmit, and the base station may configure a TDD pattern with more downlink TTIs when the served UE has downlink data to receive. As described herein, the base station may dynamically configure the TDD pattern to modify the allocation of uplink TTIs and downlink TTIs used for communication between the base station and served UEs.

As shown in FIG. 3, when neighboring base stations (shown as $BS_1$ and $BS_2$) in close geographic proximity use different TDD patterns to communicate with respective served UEs (shown as $UE_1$ and $UE_2$), different cross-link interference scenarios may occur when the neighboring base stations are deployed in blocks within the same band. For example, as shown in FIG. 3, and by reference number 310, cross-link interference may occur in a co-channel case, where the neighboring base stations communicate using the same frequency channel (e.g., the same frequency band and/or the same bandwidth part, among other examples). Additionally, or alternatively, as shown by reference number 320, cross-link interference may occur in an adjacent channel case, where the neighboring base stations communicate using the adjacent frequency channels (e.g., due to leakage between the adjacent frequency channels). For example, as shown by reference number 330, the neighboring base stations may generally communicate with respective served UEs over desired links, which generally include respective downlinks and uplinks. However, as further shown by reference number 340, different unwanted cross-link interference scenarios may occur when there are simultaneous or overlapping transmissions in uplink and downlink directions in the different TDD networks.

For example, in some cases, cross-link interference may occur when a downlink transmission from a first base station (e.g., BS1) to a first UE (e.g., UE1) occurs in the same TTI or an overlapping TTI as an uplink transmission from a second UE (e.g., UE2) to a second base station (e.g., BS2). Similarly, cross-link interference may occur when a downlink transmission from the second base station to the second UE and an uplink transmission from the first UE to the first second base station occur in the same TTI or an overlapping TTI. For example, the simultaneous or overlapping transmissions in the different directions (e.g., downlink vs. uplink) may cause cross-link interference because the downlink transmission by one base station may be received by the neighboring base station, and may therefore interfere with reception, by the neighboring base station, of the uplink transmission from the served UE. This may be referred to as downlink-to-uplink (DL-to-UL) interference, base station to base station interference, or gNB-to-gNB interference. Furthermore, the uplink transmission by one UE may be received by the UE served by the neighboring base station, and may interfere with reception, by the other UE, of the downlink transmission from the neighboring base station. This may be referred to as uplink-to-downlink (UL-to-DL) interference or UE-to-UE interference.

In general, the cross-link interference may occur and/or may increase when the UEs and/or the neighboring base stations are in close proximity, when the neighboring base stations and the served UEs are communicating using the same frequency channel and/or adjacent frequency channels, and/or when the neighboring base stations are communicating using different TDD patterns. For example, simultaneous uplink and downlink transmissions may generally occur (or may be more likely to occur) when communication associated with the neighboring base stations is unsynchronized or desynchronized (e.g., in a cross-border scenario where the neighboring base stations are located in different countries, where the neighboring base stations are associated with different wireless network operators, and/or where the neighboring base stations otherwise do not coordinate timing of uplink and downlink communications). Accordingly, in some cases, one or more of the neighboring base stations may mitigate the potential cross-link interference by avoiding scheduling the served UEs in different transmission directions and/or by scheduling the served UEs to communicate in the same transmission direction in a given TTI.

As indicated above, FIG. 3 is provided as an example. Other examples are possible and may differ from what was described with respect to FIG. 3.

Figure 4A:
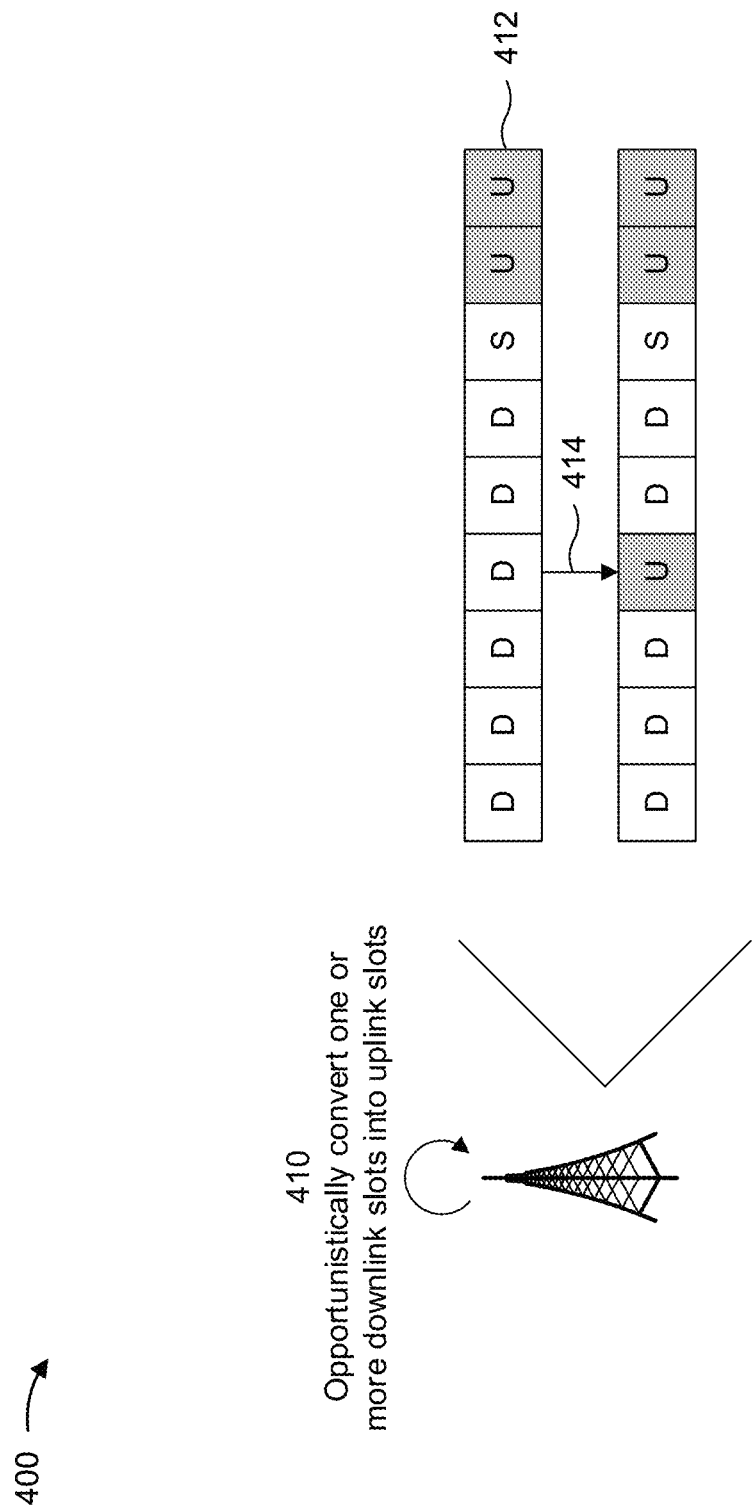
Figure 4B:
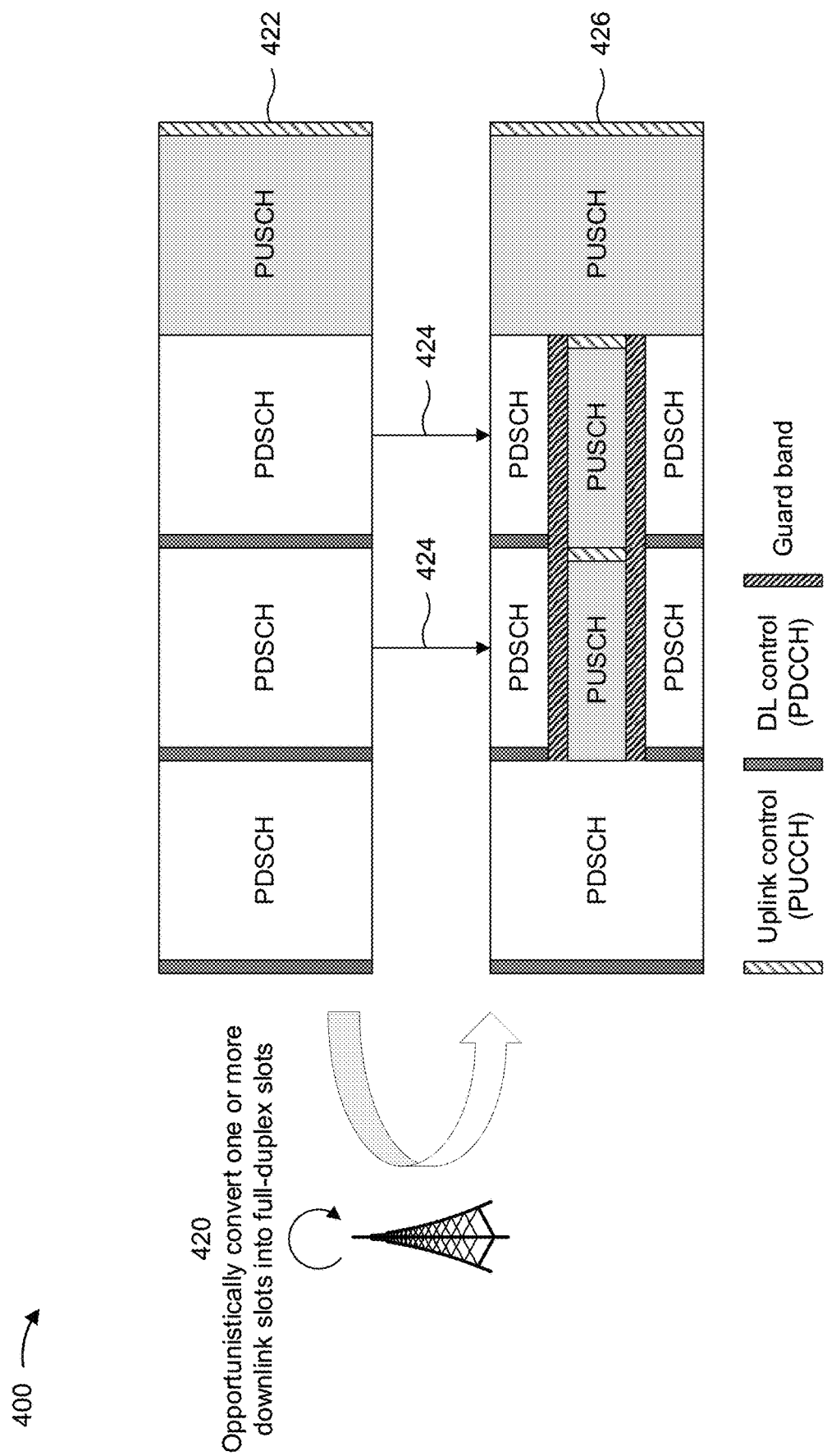

FIGS. 4A-4C are diagrams illustrating examples 400 of configuring TTIs for downlink and/or uplink communication, in accordance with the present disclosure. For example, as described above, cross-link interference may occur and/or may increase when a base station and a neighboring base station are in close proximity, when a UE served by the base station is in close proximity to a UE served by the neighboring base stations, when the base station and the neighboring base station are communicating using the same frequency channel and/or adjacent frequency channels, and/or when the base station and the neighboring base station are communicating using different TDD patterns that are unsynchronized and/or desynchronized. In such cases, cross-link interference may occur due to simultaneous or overlapping uplink and downlink transmissions. Accordingly, as described herein, examples 400 relate to different techniques that a base station may use to configure a TTI for downlink and/or uplink communication in order to mitigate potential cross-link interference.

For example, as shown in FIG. 4A, and by reference number 410, a base station may opportunistically convert one or more slots in a TDD pattern from downlink slots into uplink slots in order to receive uplink transmissions from one or more served UEs more reliably. For example, as shown by reference number 412, the base station may communicate with one or more served UEs using a TDD pattern in which each slot is either a downlink slot allocated to downlink communication, an uplink slot allocated to uplink communication, or a special slot used for switching from downlink communication to uplink communication. In some aspects, the special slot may include an initial set of downlink symbols allocated to downlink communication, a subsequent set of gap symbols used as a guard period to switch from downlink communication to uplink communication (e.g., to enable switching a transceiver from downlink to uplink and to enable a timing advance on the uplink), and a final set of uplink symbols that are allocated to uplink communication. Furthermore, in some cases (not specifically not shown in FIG. 4A), the TDD pattern may include one or more flexible slots that can be used for downlink or uplink communication.

Accordingly, in every slot in an asynchronous (e.g., unsynchronized or desynchronized) scheme, the neighboring base stations may be communicating in the same direction with no cross-link interference or the neighboring base stations may be communicating in different directions with high jamming between the neighboring base stations. In other words, because the TDD patterns used by neighboring base stations are not coordinated in an asynchronous scheme, each downlink slot in a TDD pattern used by a first base station has the potential to overlap with an uplink slot in a TDD pattern used by a neighboring base station. Furthermore, in a semi-synchronous scheme, where neighboring base stations use the same TDD patterns, the neighboring base stations may communicate in the same traffic direction (with no cross-link interference) or in different traffic directions (with high jamming) in each flexible slot. For example, a first base station may use a flexible slot for downlink communication and a neighboring base station may use the flexible slot for uplink communication.

Accordingly, in order to receive an uplink transmission from a served UE with a higher reliability, a base station in a semi-synchronous scheme may need to use a dedicated uplink slot to avoid potential cross-link interference in flexible slots due to interfering downlink transmissions by neighboring base stations. However, limiting uplink traffic to dedicated uplink slots only may increase latency for uplink communications, which may be especially detrimental for ultra-reliable low-latency communication (URLLC) traffic or other delay-sensitive communication. For example, in cases where a UE communicating using the TDD pattern shown in FIG. 4A has uplink data to transmit, the uplink data cannot be transmitted until the eighth slot (the first dedicated uplink slot) in the TDD pattern. Furthermore, in an asynchronous (e.g., cross-border and/or inter-operator) scenario, all uplink slots (including flexible slots) may be subject to potential cross-link interference due to downlink transmissions by neighboring base stations. Accordingly, as shown by reference number 414, the base station may opportunistically convert one or more downlink slots into uplink slots in order to receive data and/or control information from UEs more reliably.

For example, in FIG. 4A, the base station opportunistically converts the fourth slot in the TDD pattern from a downlink slot into an uplink slot such that a latency associated with an uplink transmission may be reduced (e.g., by allowing the UE to transmit four slots earlier than would otherwise be possible in the original TDD pattern). In some aspects, the one or more downlink slots to convert into uplink slots may be identified based on interference that the base station measures during each slot and/or based on interference that served UEs measure and report to the base station (e.g., the base station may determine that a neighboring base station is using one or more uplink slots as downlink slots based on measuring a high level of interference during the uplink slots and/or may determine that a neighboring base station is using a downlink slot as an uplink slot based on a UE reporting a high level of interference during the downlink slot). Additionally, or alternatively, neighboring base stations may share information related to respective TDD patterns that are in use at the neighboring base stations (e.g., over a backhaul interface). In this way, the base station may improve reliability and/or reduce latency associated with uplink communication by opportunistically converting one or more downlink slots into uplink slots such that the neighboring base stations are communicating in the same traffic direction in the converted downlink slot(s).

Additionally, or alternatively, as shown in FIG. 4B, and by reference number 420, the base station may opportunistically convert one or more downlink slots into full-duplex slots that include overlapping or non-overlapping downlink and uplink resource allocations to support simultaneous downlink transmission and uplink reception in the same frequency band, referred to as in-band frequency duplexing (IBFD), or in the same frequency sub-band, referred to as sub-band frequency duplexing (SBFD). For example, as shown by reference number 422, a base station may communicate with one or more served UEs using a TDD pattern that includes three downlink slots followed by an uplink slot. The downlink slots may each include a downlink control portion including time and frequency resources allocated to a physical downlink control channel (PDCCH) followed by a downlink data portion including time and frequency resources allocated to a physical downlink shared channel (PDSCH). Furthermore, as shown, the uplink slot may include an uplink data portion including time and frequency resources allocated to a physical uplink shared channel (PUSCH), which is followed by an uplink control portion including time and frequency resources allocated to a physical uplink control channel (PUCCH) (e.g., for transmitting hybrid automatic repeat request (HARQ) feedback or uplink control information (UCI)).

Accordingly, as shown by reference number 424, a base station having full-duplex capabilities (e.g., capabilities to simultaneously transmit and receive in the same frequency band or the same frequency sub-band) may convert one or more downlink slots into full-duplex slots. In such cases, as shown by reference number 426, the full-duplex slots may include separate downlink and uplink resource allocations, which may be separated by a guard band to reduce or mitigate interference that may be caused by the simultaneous transmissions in different directions. For example, in some aspects, the base station may sense a frequency channel in a downlink slot using a subset of antennas and/or a different antenna panel (e.g., an antenna panel other than an antenna panel used for downlink communication), and may identify one or more downlink slots that experience jamming or interference that fails to satisfy a threshold (e.g., a threshold based on a quality of service (QoS) requirement, such as a minimum uplink signal-to-interference-plus-noise ratio (SINR) or a minimum uplink RSRP). For example, the jamming or interference may be cross-link interference caused by simultaneous transmissions by neighboring base stations associated with other operators in a co-channel or adjacent channel scenario, or the jamming or interference may be self-interference caused by the simultaneous downlink and uplink transmissions.

Accordingly, in cases where the base station identifies a downlink slot in which the sensed interference fails to satisfy a threshold, the base station may opportunistically convert the downlink slot into a full-duplex slot in order to receive data and/or control information from UEs more reliably and/or to reduce latency of uplink communication. Furthermore, in such cases, the base station may transmit a group common slot format indicator (SFI) to one or more served UEs to indicate the new slot pattern, and may indicate the change of slot format to other base stations via an inter-base station link (e.g., over an Xn interface).

As shown in FIG. 4C, and by reference number 430, a base station may define a periodic slot configuration based on one or more common TDD patterns using cell-specific signaling. For example, as shown, a TDD-UL-DL-ConfigurationCommon parameter may indicate one or more common TDD patterns to be used in a cell associated with a base station, where each common TDD pattern includes a transmission periodicity (e.g., a periodicity of the common TDD pattern), a number of consecutive full downlink slots at the start of each common TDD pattern, a number of consecutive downlink symbols that follow the last full downlink slot, a number of consecutive full uplink slots at the end of each common TDD pattern, and a number of consecutive uplink symbols that precede the first full uplink slot. In general, the slot configuration may include one or more flexible symbols (usable for downlink or uplink communication) between the last downlink symbol and the first uplink symbol, and the slots that encompass the flexible symbols, the consecutive downlink symbols that follow the last full downlink slot, and the consecutive uplink symbols that precede the first full uplink slot may be defined as flexible slots.

Accordingly, as further shown by reference number 435, the base station may configure all or part of the flexible slots and/or symbols using a dedicated TDD pattern (e.g., using UE-specific or group-common signaling). For example, a dedicated TDD pattern may be defined using a TDD-UL-DL-ConfigDedicated parameter, which indicates a slot index (e.g., a slot within a particular common TDD pattern) and one or more parameters to allocate symbols in the slot associated with the slot index to downlink or uplink communication. For example, the dedicated TDD pattern may indicate that all symbols in the indicated slot are allocated to downlink communication, may indicate that all symbols in the indicated slot are allocated to uplink communication, or may indicate a number of consecutive symbols in the beginning of the slot that are allocated to downlink communication and/or a number of consecutive symbols at the end of the slot that are allocated to uplink communication.

In some cases, the base station may indicate the slot configuration to be used in a cell associated with the base station via a common TDD pattern and/or may indicate a slot configuration to be used by one or more UEs served by the base station via a dedicated TDD pattern that configures (or reconfigures) one or more flexible slots or symbols associated with the common TDD pattern. Additionally, or alternatively, the base station may transmit an SFI to indicate a slot configuration that allocates symbols within a slot to be downlink symbols, uplink symbols, or flexible symbols. For example, the SFI may be transmitted in downlink control information (DCI) that has a specific format associated with indicating a slot format (e.g., DCI format 2_0), and the base station may configure a served UE with a SlotFormatCombination parameter that causes the UE to monitor the DCI associated with indicating the slot format. In such cases, the DCI may include an SFI, which may have a value within a particular range (e.g., from 0 to 255) to indicate an allocation of downlink, uplink, and flexible symbols within a particular slot (e.g., as defined in 3GPP Technical Specification 38.213, Table 11.1.1-1). Accordingly, as described herein, a UE may generally determine the specific slot configuration allocating TTIs to downlink and/or uplink communication based on a combination of the common TDD pattern, the dedicated TDD pattern, and the SFI. Furthermore, in cases where full-duplex communication is enabled in a particular slot or symbol, the full-duplex slot(s) or symbol(s) may similarly be indicated via the common TDD pattern, the dedicated TDD pattern, and the SFI.

As described above, in some cases (e.g., dynamic TDD, cross-border communication, asynchronous inter-operator communication, and/or semi-synchronous intra-operator communication, among other examples), a TDD pattern or slot configuration used in a serving cell may differ from a TDD pattern or slot configuration used in a neighboring cell. In cases where the TDD patterns or slot configurations include simultaneous or overlapping downlink and uplink communication, there is a potential for cross-link interference that may reduce reliability and/or performance at a receiver (e.g., at a UE receiving a downlink transmission while a nearby UE is performing an uplink transmission, or at a base station receiving an uplink transmission while a neighboring base station is performing a downlink transmission). In some cases, indicating a TDD pattern or SFI used in a neighboring cell to a UE may enable improved network operation and/or optimization, may enable the UE to perform measurements and determine interference caused by communication in neighboring cells, and/or may enable the UE to perform a handover operation more efficiently with a lower latency. However, existing techniques that are used in wireless networks lack a mechanism to indicate the TDD pattern or SFI used in a neighboring cell to a UE.

Accordingly, some aspects described herein relate to techniques and apparatuses to signal a TDD pattern and SFI for a neighboring cell to a UE. For example, a base station providing a serving cell for a UE may receive, from a neighboring cell, information indicating one or more common TDD patterns and/or one or more dedicated TDD patterns in use in the neighboring cell, and the base station may indicate the common and dedicated TDD patterns to served UEs via system information and/or radio resource control (RRC) signaling. Furthermore, in some aspects, the base station may receive information indicating the SFI used in the neighboring cell for one or more slots, and the base station may indicate the SFI used in the neighboring cell to the served UEs. For example, the SFI used in the serving cell may be indicated to served UEs using DCI format 2_0, and the SFI used in the neighboring cell may be indicated to the served UEs via RRC signaling, a medium access control (MAC) control element (MAC-CE), or DCI (e.g., the serving cell DCI format 2_0 or a separate DCI). Additionally, or alternatively, the base station may indicate, to the UE, one or more parameters to enable the UE to decode the DCI format 2_0 of the neighboring cell such that the UE can directly obtain the SFI from the neighboring cell DCI format 2_0 of the neighboring cell. In this way, the UE may determine the slot configuration used in the neighboring cell, which may enable improved network operation and/or optimization, may enable the UE to perform measurements and determine interference caused by communication in neighboring cells, and/or may enable the UE to perform a handover operation more efficiently with a lower latency (e.g., because the UE already knows the TDD pattern used in the target cell), among other examples.

As indicated above, FIGS. 4A-4C are provided as examples. Other examples are possible and may differ from what was described with respect to FIGS. 4A-4C.

Figure 5:
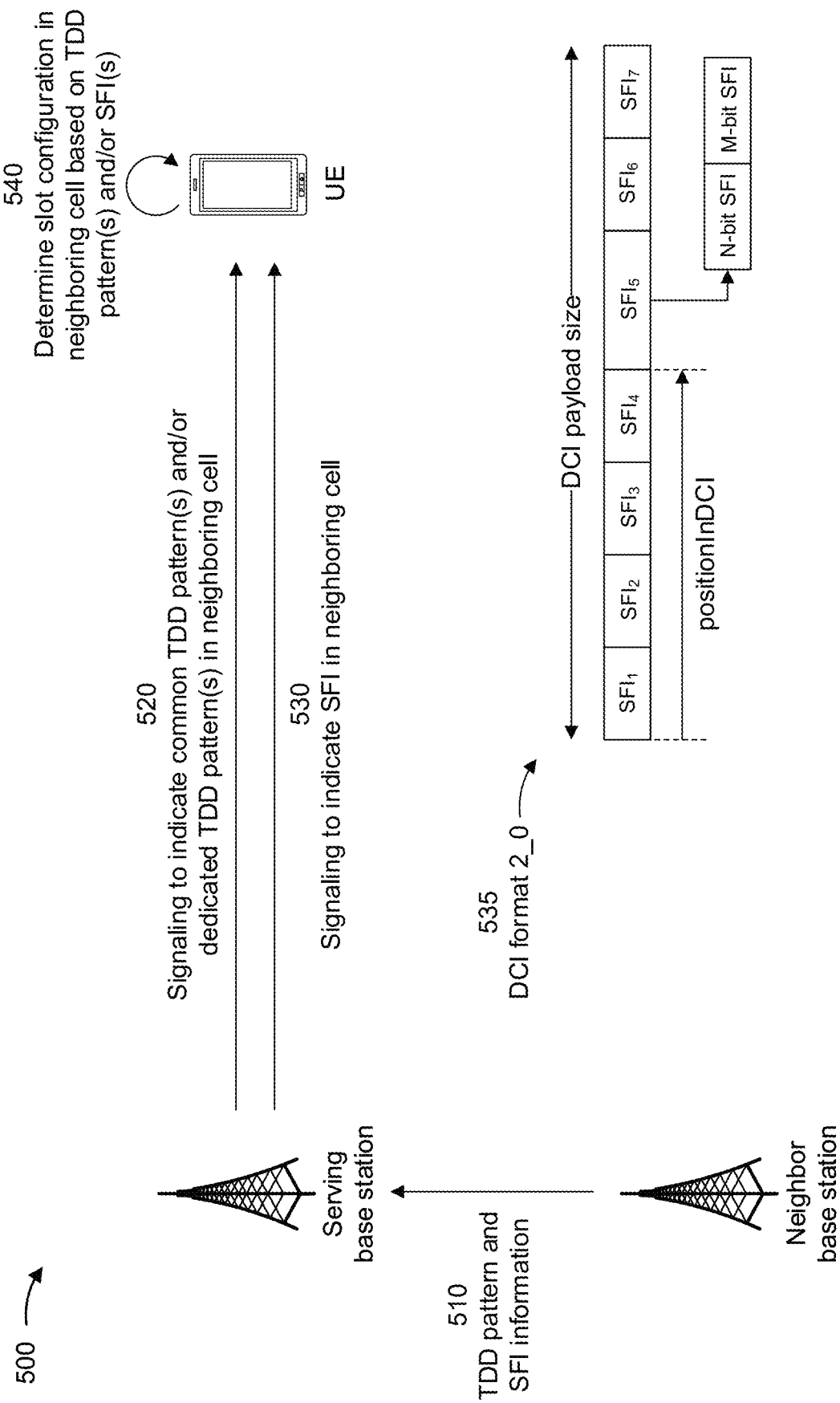
FIG. 5 is a diagram illustrating an example associated with signaling a time division duplexing (TDD) pattern and slot format indicator (SFI) for a neighboring cell, in accordance with the present disclosure.

FIG. 5 is a diagram illustrating an example 500 associated with signaling a TDD pattern and SFI for a neighboring cell, in accordance with the present disclosure. As shown in FIG. 5, example 500 includes communication between a UE and a serving base station providing a serving cell for the UE. Furthermore, as shown, example 500 includes communication between the serving base station and a neighbor base station. Accordingly, as used herein, the term "serving cell" can refer to a coverage area of the serving base station and/or to the serving base station, and the term "neighboring cell" can refer to a coverage area of the neighboring base station and/or to the neighbor base station. In some aspects, the serving base station and the UE may communicate in a wireless network (e.g., wireless network 100) via a wireless access link, which may include an uplink and a downlink. Furthermore, the serving base station and the neighbor base station may communicate over a backhaul link (e.g., an Xn interface). In some aspects, the serving base station and the neighbor base station may be associated with the same wireless network or network operator (e.g., in a semi-synchronous communication scheme) or with different wireless networks or network operators (e.g., in an unsynchronized or desynchronized scheme), as described in further detail above.

As shown in FIG. 5, and by reference number 510, the serving base station may receive, from the neighbor base station, information that indicates one or more TDD patterns and one or more SFIs in use in the neighboring cell. For example, in some aspects, the one or more TDD patterns may include one or more common TDD patterns that are configured in the neighboring cell via cell-specific signaling for all served nodes in the neighboring cell and/or one or more dedicated TDD patterns that are configured in the neighboring cell for one or more specific served nodes in the neighboring cell (e.g., via UE-specific signaling or group-common signaling targeting a set of UEs). Furthermore, in some aspects, the information related to the one or more SFIs in use in the neighboring cell may include the content of DCI format 2_0 used to indicate the SFI to served nodes in the neighboring cell and/or information to enable decoding of the DCI format 2_0 used to indicate the SFI to served nodes in the neighboring cell (e.g., one or more control resource sets (CORESETs) and/or search spaces associated with the DCI format 2_0 in the neighboring cell, an SFI radio network temporary identifier (SFI-RNTI) used to scramble the DCI format 2_0 in the neighboring cell, and/or a positionInDCI parameter that indicates the location of the field in the DCI format 2_0 that includes the SFI of the neighboring cell).

As further shown in FIG. 5, and by reference number 520, the serving base station may transmit, and the UE may receive, signaling that indicates the one or more common TDD patterns and the one or more dedicated TDD patterns used in the neighboring cell. For example, in some aspects, the common TDD pattern(s) and the dedicated TDD pattern(s) may be configured in the neighboring cell via semi-static RRC signaling, as the common TDD pattern(s) and the dedicated TDD pattern(s) may change relatively infrequently. Accordingly, in some aspects, the one or more common TDD patterns used in the neighboring cell may be indicated via system information and/or RRC signaling, and the one or more dedicated TDD patterns used in the neighboring cell may be indicated via RRC signaling.

As further shown in FIG. 5, and by reference number 530, the serving base station may transmit, and the UE may receive, signaling that indicates the SFI used in the neighboring cell. For example, the serving base station may generally configure the UE to monitor DCI format 2_0 to determine the SFI of the serving cell, while the SFI used in the neighboring cell may be indicated via RRC signaling or via a MAC-CE. Alternatively, in some aspects, the SFI used in the neighboring cell may be indicated in a separate DCI (e.g., a DCI that is separate from the DCI format 2_0 that indicates the SFI of the serving cell) or together with the DCI format 2_0 that indicates the SFI of the serving cell. For example, in FIG. 5, reference number 535 illustrates an example DCI message having format 2_0, where the DCI message has a payload size and various SFI fields. To decode the DCI format 2_0 and determine the SFI in the serving cell, the serving base station may configure the UE with a positionInDCI parameter that indicates a position of the field in the DCI format 2_0 that carries the SFI used in the serving cell. For example, as shown the positionInDCI parameter may have a value that indicates a starting bit position of the field in the DCI format 2_0 that carries the SFI used in the serving cell. Accordingly, in cases where the SFI used in the neighboring cell is indicated in a separate DCI, the separate DCI may have a similar structure as the DCI format 2_0 that carries the SFI used in the serving cell. For example, the separate DCI may contain one or more SFI fields, and the UE may use the positionInDCI parameter configured for the serving cell DCI format 2_0 to determine the location (e.g., starting bit) of the SFI associated with the neighboring cell. In other words, the UE may be configured with one (1) positionInDCI parameter (e.g., via RRC signaling), which may indicate the location of the field in the DCI format 2_0 that indicates the SFI of the serving cell and the location of the field in the separate DCI used to indicate the SFI of the neighboring cell.

Alternatively, in cases where the SFI used in the neighboring cell is indicated or together with the DCI format 2_0 that indicates the SFI of the serving cell, a larger field may be included in the DCI format 2_0 to jointly indicate the SFI of the serving cell and the neighboring cell. For example, as shown in FIG. 5, the positionInDCI parameter may point to a field in the DCI format 2_0 (e.g., shown as $SFI_5$), which may include an N-bit field to indicate the SFI of the serving cell and an M-bit field to indicate the SFI of the neighboring cell, where N and M are integers having a value greater than or equal to one (1). Alternatively, in some aspects, the serving base station may configure a list of positionInDCI parameters for different neighboring cells (e.g., a first neighboring cell may be associated with a first positionInDCI parameter, a second neighboring cell may be associated with a second positionInDCI parameter, and so on). In this case, the UE may read the SFI of the serving cell from the DCI format 2_0 based on the value of the positionInDCI parameter that is configured for the serving cell, and may read the SFI of the neighboring cell from the DCI format 2_0 based on the value of the positionInDCI parameter that is configured for the corresponding neighboring cell (e.g., a positionInDCI parameter that corresponds to a cell identifier associated with the neighboring cell). In this way, the serving base station may transmit one (1) DCI message to indicate the SFI of the serving and neighboring cells, which may reduce signaling overhead relative to a scheme that uses a separate DCI.

Alternatively, in some aspects, the serving base station may provide the UE with one or more parameters to enable the UE to decode the DCI format 2_0 of the neighboring cell, whereby the UE may read the SFI of the neighboring cell directly from the DCI format 2_0 that the neighboring base station transmits to served nodes in the neighboring cell. For example, in some aspects, the signaling from the base station may include RRC signaling, a MAC-CE, and/or DCI that indicates a configuration of one or more CORESETs and/or search spaces associated with the DCI format 2_0 of the neighboring cell, which may enable the UE to determine the appropriate time and frequency resources to monitor for the DCI format 2_0 of the neighboring cell. Furthermore, the signaling may indicate the SFI-RNTI of the neighboring cell, which is used to scramble the DCI format 2_0, such that the UE can detect and decode the DCI format 2_0 of the neighboring cell. Furthermore, the signaling may indicate the positionInDCI parameter configured in the neighboring cell, which may enable the UE to determine the appropriate field in the DCI format 2_0 of the neighboring cell that carries the SFI used in the neighboring cell. In some aspects, the CORESET(s), search space(s), SFI-RNTI, and positionInDCI parameter may be explicitly signaled to the UE, or the serving base station may signal other information that enables the UE to derive the CORESET(s), search space(s), SFI-RNTI, and positionInDCI parameter used to decode the DCI format 2_0 of the neighboring cell.

Accordingly, as further shown in FIG. 5, and by reference number 540, the UE may determine the slot configuring in the neighboring cell based on the common TDD patterns used in the neighboring cell, the dedicated TDD patterns used in the neighboring cell, and the SFI used in the neighboring cell. For example, as described in further detail above with reference to FIG. 4C, a common TDD pattern, a dedicated TDD pattern, and an SFI may collectively indicate an allocation of TTIs (e.g., slots and/or symbols) to downlink and/or uplink communication. In this way, by enabling the UE to determine the slot configuration used in the neighboring cell, network operation and/or optimization may be improved (e.g., by avoiding scheduling simultaneous or overlapping communications in different transmission directions), the UE may be enabled to perform measurements and determine interference caused by communication in neighboring cells, and/or may enable the UE to perform a handover operation more efficiently with a lower latency (e.g., because the UE already knows the TDD pattern used in the target cell), among other examples.

As indicated above, FIG. 5 is provided as an example. Other examples are possible and may differ from what was described with respect to FIG. 5.

Figure 6:
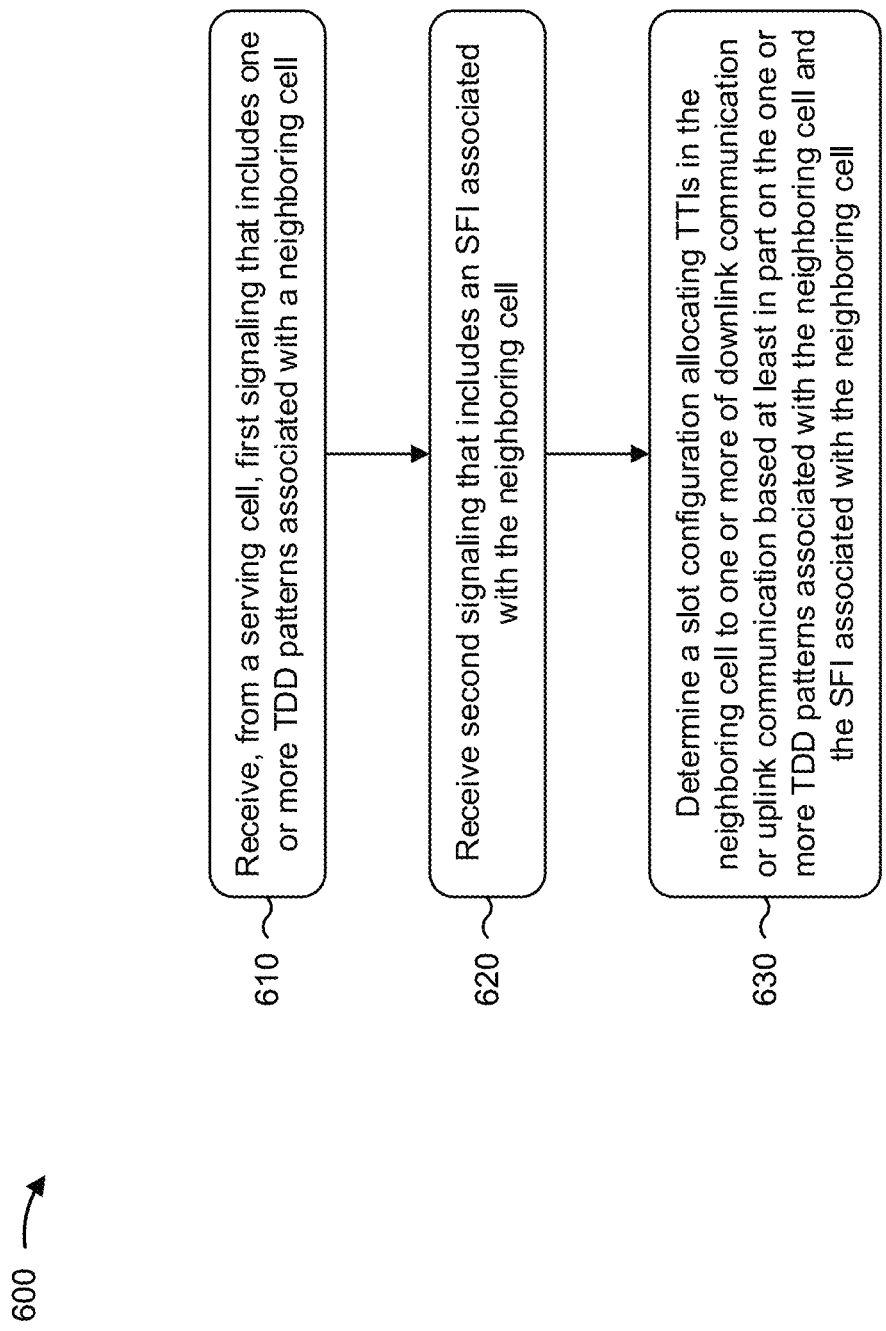
FIG. 6 is a diagram illustrating an example process associated with signaling a TDD pattern and SFI for a neighboring cell, in accordance with the present disclosure.

FIG. 6 is a diagram illustrating an example process 600 performed, for example, by a UE, in accordance with the present disclosure. Example process 600 is an example where the UE (e.g., UE 120) performs operations associated with signaling a TDD pattern and SFI for a neighboring cell.

As shown in FIG. 6, in some aspects, process 600 may include receiving, from a serving cell, first signaling that includes one or more TDD patterns associated with a neighboring cell (block 610). For example, the UE (e.g., using reception component 702, depicted in FIG. 7) may receive, from a serving cell, first signaling that includes one or more TDD patterns associated with a neighboring cell, as described above.

As further shown in FIG. 6, in some aspects, process 600 may include receiving second signaling that includes an SFI associated with the neighboring cell (block 620). For example, the UE (e.g., using reception component 702, depicted in FIG. 7) may receive second signaling that includes an SFI associated with the neighboring cell, as described above.

As further shown in FIG. 6, in some aspects, process 600 may include determining a slot configuration allocating TTIs in the neighboring cell to one or more of downlink communication or uplink communication based at least in part on the one or more TDD patterns associated with the neighboring cell and the SFI associated with the neighboring cell (block 630). For example, the UE (e.g., using determination component 708, depicted in FIG. 7) may determine a slot configuration allocating TTIs in the neighboring cell to one or more of downlink communication or uplink communication based at least in part on the one or more TDD patterns associated with the neighboring cell and the SFI associated with the neighboring cell, as described above.

Process 600 may include additional aspects, such as any single aspect or any combination of aspects described below and/or in connection with one or more other processes described elsewhere herein.

In a first aspect, the first signaling includes system information or an RRC configuration that indicates one or more common TDD patterns that are associated with all served nodes in the neighboring cell.

In a second aspect, alone or in combination with the first aspect, the first signaling includes an RRC configuration that indicates one or more dedicated TDD patterns that are associated with one or more served nodes in the neighboring cell.

In a third aspect, alone or in combination with one or more of the first and second aspects, the second signaling includes an RRC configuration or a MAC-CE received from the serving cell.

In a fourth aspect, alone or in combination with one or more of the first through third aspects, the second signaling is received from the serving cell and includes DCI that is separate from a DCI format associated with indicating an SFI associated with the serving cell.

In a fifth aspect, alone or in combination with one or more of the first through fourth aspects, process 600 includes determining a location of the SFI associated with the neighboring cell within the DCI based at least in part on a parameter that indicates, within DCI transmitted by the serving cell, a starting bit position for the SFI associated with the serving cell.

In a sixth aspect, alone or in combination with one or more of the first through fifth aspects, the second signaling is received from the serving cell and includes DCI having a format associated with indicating an SFI associated with the serving cell.

In a seventh aspect, alone or in combination with one or more of the first through sixth aspects, process 600 includes determining, within the DCI, a location of an SFI field that includes the SFI associated with the serving cell and the SFI associated with the neighboring cell based at least in part on a parameter that indicates, within DCI transmitted by the serving cell, the location of the SFI field that includes the SFI associated with the serving cell.

In an eighth aspect, alone or in combination with one or more of the first through seventh aspects, process 600 includes determining a parameter that indicates a starting bit position for the SFI associated with the neighboring cell based at least in part on a cell identifier associated with the neighboring cell, and determining, within the DCI, a location of an SFI field dedicated to the SFI associated with the neighboring cell based at least in part on the parameter that indicates the starting bit position for the SFI associated with the neighboring cell.

In a ninth aspect, alone or in combination with one or more of the first through eighth aspects, the second signaling is received from the neighboring cell and includes DCI having a format associated with indicating the SFI associated with the neighboring cell.

In a tenth aspect, alone or in combination with one or more of the first through ninth aspects, process 600 includes receiving, from the serving cell, configuration information for the DCI, and decoding the DCI based at least in part on the configuration information.

In an eleventh aspect, alone or in combination with one or more of the first through tenth aspects, the configuration information for the DCI includes one or more of a CORESET associated with the DCI, a search space associated with the DCI, a parameter that indicates a location of the SFI associated with the serving cell within the DCI, or an RNTI used to scramble the DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
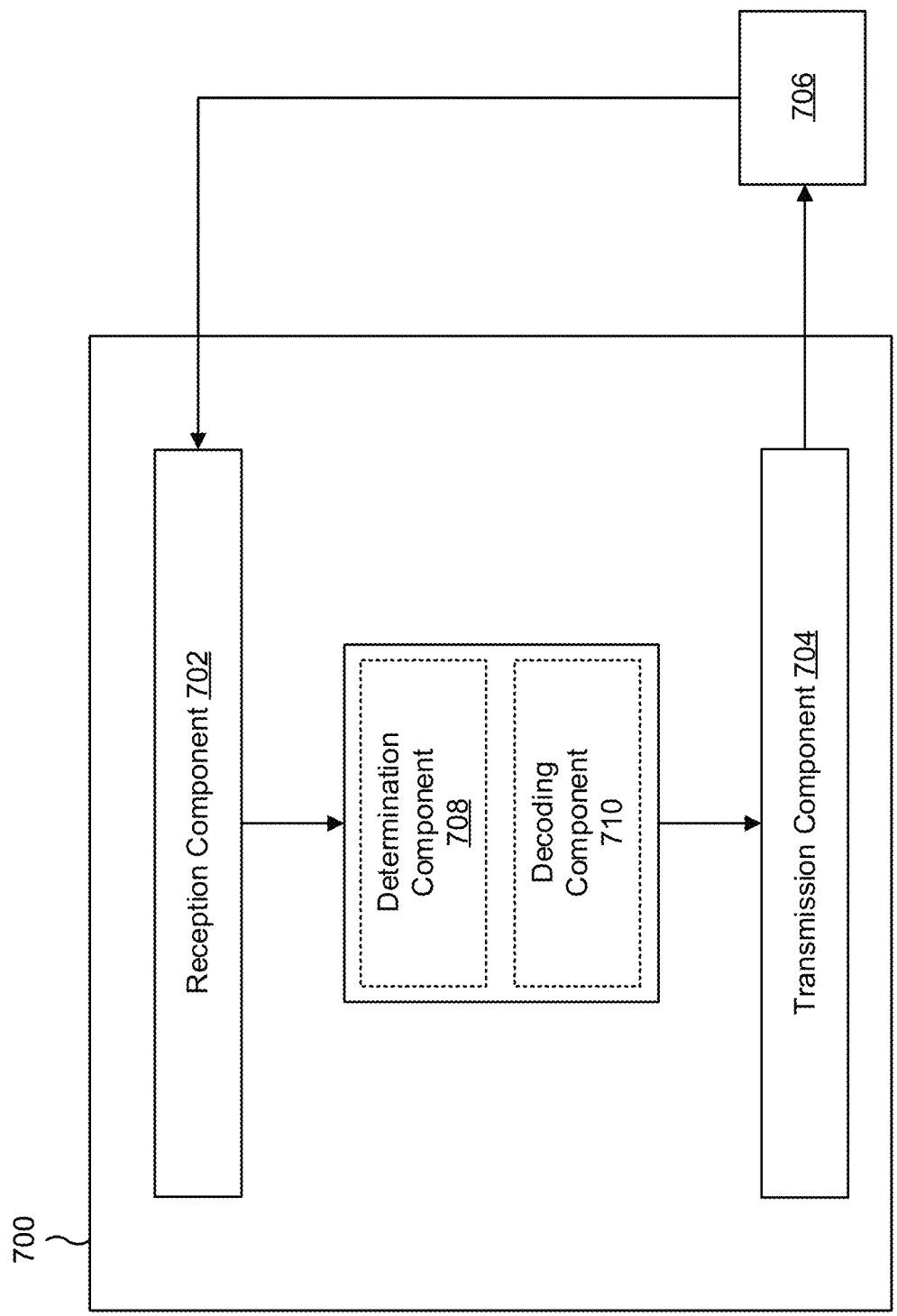
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708 or a decoding component 710, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive, from a serving cell, first signaling that includes one or more TDD patterns associated with a neighboring cell. The reception component 702 may receive second signaling that includes an SFI associated with the neighboring cell. The determination component 708 may determine a slot configuration allocating TTIs in the neighboring cell to one or more of downlink communication or uplink communication based at least in part on the one or more TDD patterns associated with the neighboring cell and the SFI associated with the neighboring cell.

The determination component 708 may determine a location of the SFI associated with the neighboring cell within the DCI based at least in part on a parameter that indicates, within DCI transmitted by the serving cell, a starting bit position for the SFI associated with the serving cell.

The determination component 708 may determine, within the DCI, a location of an SFI field that includes the SFI associated with the serving cell and the SFI associated with the neighboring cell based at least in part on a parameter that indicates, within DCI transmitted by the serving cell, the location of the SFI field that includes the SFI associated with the serving cell.

The determination component 708 may determine a parameter that indicates a starting bit position for the SFI associated with the neighboring cell based at least in part on a cell identifier associated with the neighboring cell. The determination component 708 may determine, within the DCI, a location of an SFI field dedicated to the SFI associated with the neighboring cell based at least in part on the parameter that indicates the starting bit position for the SFI associated with the neighboring cell.

The reception component 702 may receive, from the serving cell, configuration information for the DCI. The decoding component 710 may decode the DCI based at least in part on the configuration information.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
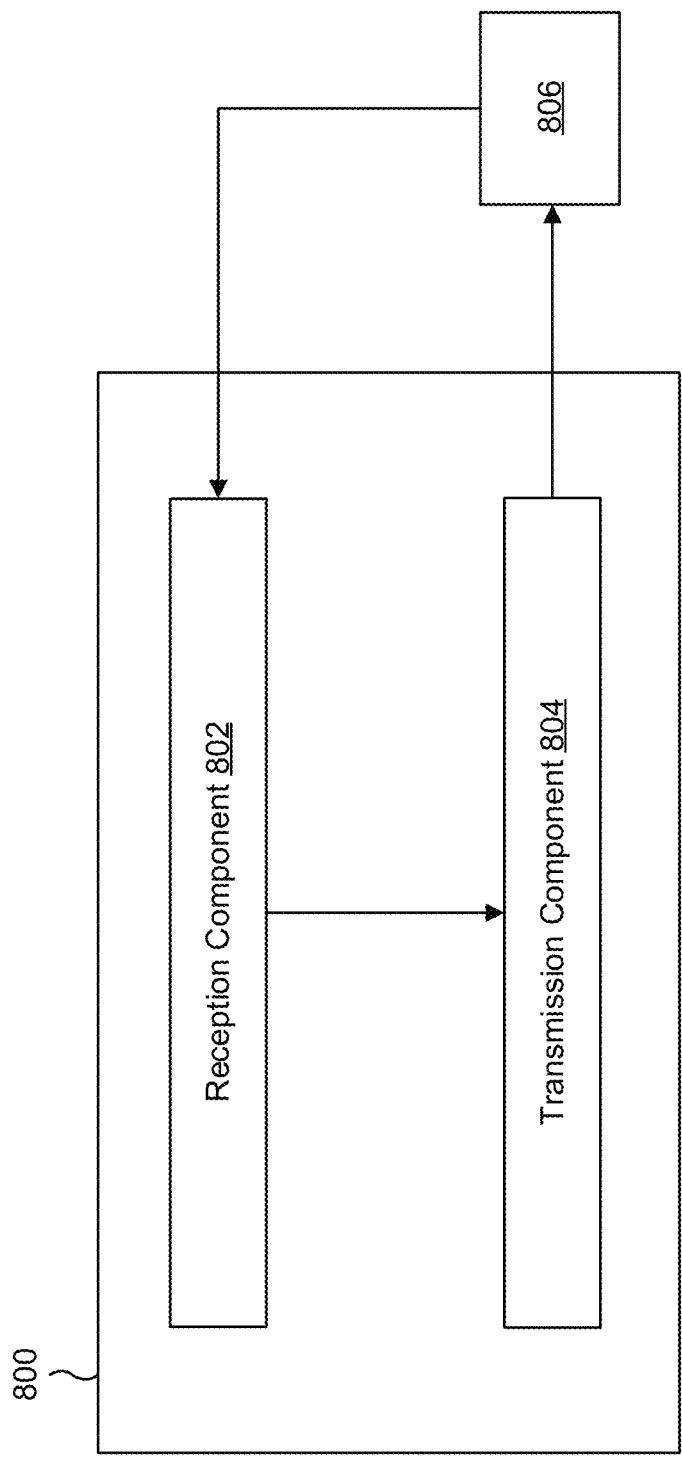

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIG. 5. Additionally, or alternatively, the apparatus 800 may be configured to perform one or more processes described herein. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit, to a UE, first signaling that includes one or more TDD patterns associated with a neighboring cell. The transmission component 804 may transmit, to the UE, second signaling that includes an SFI associated with the neighboring cell. Accordingly, the UE may determine a slot configuration allocating TTIs in the neighboring cell to one or more of downlink communication or uplink communication based at least in part on the one or more TDD patterns associated with the neighboring cell and the SFI associated with the neighboring cell.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: receiving, from a serving cell, first signaling that includes one or more TDD patterns associated with a neighboring cell; receiving second signaling that includes an SFI associated with the neighboring cell; and determining a slot configuration allocating TTIs in the neighboring cell to one or more of downlink communication or uplink communication based at least in part on the one or more TDD patterns associated with the neighboring cell and the SFI associated with the neighboring cell.

Aspect 2: The method of Aspect 1, wherein the first signaling includes system information or an RRC configuration that indicates one or more common TDD patterns that are associated with all served nodes in the neighboring cell.

Aspect 3: The method of any of Aspects 1-2, wherein the first signaling includes an RRC configuration that indicates one or more dedicated TDD patterns that are associated with one or more served nodes in the neighboring cell.

Aspect 4: The method of any of Aspects 1-3, wherein the second signaling includes an RRC configuration or a MAC-CE received from the serving cell.

Aspect 5: The method of any of Aspects 1-3, wherein the second signaling is received from the serving cell and includes DCI that is separate from a DCI format associated with indicating an SFI associated with the serving cell.

Aspect 6: The method of Aspect 5, further comprising: determining a location of the SFI associated with the neighboring cell within the DCI based at least in part on a parameter that indicates, within DCI transmitted by the serving cell, a starting bit position for the SFI associated with the serving cell.

Aspect 7: The method of any of Aspects 1-3, wherein the second signaling is received from the serving cell and includes DCI having a format associated with indicating an SFI associated with the serving cell.

Aspect 8: The method of Aspect 7, further comprising: determining, within the DCI, a location of an SFI field that includes the SFI associated with the serving cell and the SFI associated with the neighboring cell based at least in part on a parameter that indicates, within DCI transmitted by the serving cell, the location of the SFI field that includes the SFI associated with the serving cell.

Aspect 9: The method of Aspect 7, further comprising: determining a parameter that indicates a starting bit position for the SFI associated with the neighboring cell based at least in part on a cell identifier associated with the neighboring cell; and determining, within the DCI, a location of an SFI field dedicated to the SFI associated with the neighboring cell based at least in part on the parameter that indicates the starting bit position for the SFI associated with the neighboring cell.

Aspect 10: The method of any of Aspects 1-3, wherein the second signaling is received from the neighboring cell and includes DCI having a format associated with indicating the SFI associated with the neighboring cell.

Aspect 11: The method of Aspect 10, further comprising: receiving, from the serving cell, configuration information for the DCI; and decoding the DCI based at least in part on the configuration information.

Aspect 12: The method of Aspect 11, wherein the configuration information for the DCI includes one or more of a CORESET associated with the DCI, a search space associated with the DCI, a parameter that indicates a location of the SFI associated with the serving cell within the DCI, or an RNTI used to scramble the DCI.

Aspect 13: An apparatus for wireless communication at a device, comprising a processor; memory coupled with the processor; and instructions stored in the memory and executable by the processor to cause the apparatus to perform the method of any of Aspects 1-12.

Aspect 14: A device for wireless communication, comprising a memory and one or more processors coupled to the memory, the memory and the one or more processors configured to perform the method of any of Aspects 1-12.

Aspect 15: An apparatus for wireless communication, comprising at least one means for performing the method of any of Aspects 1-12.

Aspect 16: A non-transitory computer-readable medium storing code for wireless communication, the code comprising instructions executable by a processor to perform the method of any of Aspects 1-12.

Aspect 17: A non-transitory computer-readable medium storing a set of instructions for wireless communication, the set of instructions comprising one or more instructions that, when executed by one or more processors of a device, cause the device to perform the method of any of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a serving cell, first signaling that indicates one or more time division duplexing (TDD) patterns in use in a neighboring cell;
   receiving second signaling that indicates a slot format indicator (SFI) in use in the neighboring cell; and
   determining a slot configuration allocating transmission time intervals (TTIs) in the neighboring cell to one or more of downlink communication or uplink communication based at least in part on the one or more TDD patterns in use in the neighboring cell and the SFI in use in the neighboring cell.

2. The method of claim 1, wherein the first signaling includes system information or a radio resource control configuration that indicates one or more common TDD patterns that are associated with all served nodes in the neighboring cell.

3. The method of claim 1, wherein the first signaling includes a radio resource control configuration that indicates one or more dedicated TDD patterns that are associated with one or more served nodes in the neighboring cell.

4. The method of claim 1, wherein the second signaling includes a radio resource control configuration or a medium access control (MAC) control element (MAC-CE) received from the serving cell.

5. The method of claim 1, wherein the second signaling is received from the serving cell and includes downlink control information (DCI) that is separate from a DCI format associated with indicating an SFI associated with the serving cell.

6. The method of claim 5, further comprising:
   determining a location of the SFI associated with the neighboring cell within the DCI based at least in part on a parameter that indicates, within DCI transmitted by the serving cell, a starting bit position for the SFI associated with the serving cell.

7. The method of claim 1, wherein the second signaling is received from the serving cell and includes downlink control information (DCI) having a format associated with indicating an SFI associated with the serving cell.

8. The method of claim 7, further comprising:
   determining, within the DCI, a location of an SFI field that includes the SFI associated with the serving cell and the SFI associated with the neighboring cell based at least in part on a parameter that indicates, within DCI transmitted by the serving cell, the location of the SFI field that includes the SFI associated with the serving cell.

9. The method of claim 7, further comprising:
   determining a parameter that indicates a starting bit position for the SFI associated with the neighboring cell based at least in part on a cell identifier associated with the neighboring cell; and
   determining, within the DCI, a location of an SFI field dedicated to the SFI associated with the neighboring cell based at least in part on the parameter that indicates the starting bit position for the SFI associated with the neighboring cell.

10. The method of claim 1, wherein the second signaling is received from the neighboring cell and includes downlink control information (DCI) having a format associated with indicating the SFI associated with the neighboring cell.

11. The method of claim 10, further comprising:
    receiving, from the serving cell, configuration information for the DCI; and
    decoding the DCI based at least in part on the configuration information.

12. The method of claim 11, wherein the configuration information for the DCI includes one or more of a control resource set associated with the DCI, a search space associated with the DCI, a parameter that indicates a location of the SFI associated with the serving cell within the DCI, or a radio network temporary identifier used to scramble the DCI.

13. A user equipment (UE) for wireless communication, comprising:
    a memory; and
    one or more processors, coupled to the memory, configured to:
    receive, from a serving cell, first signaling that indicates one or more time division duplexing (TDD) patterns in use in a neighboring cell;
    receive second signaling that indicates a slot format indicator (SFI) in use in the neighboring cell; and
    determine a slot configuration allocating transmission time intervals (TTIs) in the neighboring cell to one or more of downlink communication or uplink communication based at least in part on the one or more TDD patterns in use in the neighboring cell and the SFI in use in the neighboring cell.

14. The UE of claim 13, wherein the first signaling includes system information or a radio resource control configuration that indicates one or more common TDD patterns that are associated with all served nodes in the neighboring cell.

15. The UE of claim 13, wherein the first signaling includes a radio resource control configuration that indicates one or more dedicated TDD patterns that are associated with one or more served nodes in the neighboring cell.

16. The UE of claim 13, wherein the second signaling includes a radio resource control configuration or a medium access control (MAC) control element (MAC-CE) received from the serving cell.

17. The UE of claim 13, wherein the second signaling is received from the serving cell and includes downlink control information (DCI) that is separate from a DCI format associated with indicating an SFI associated with the serving cell.

18. The UE of claim 17, wherein the one or more processors are further configured to:
 determine a location of the SFI associated with the neighboring cell within the DCI based at least in part on a parameter that indicates, within DCI transmitted by the serving cell, a starting bit position for the SFI associated with the serving cell.

19. The UE of claim 13, wherein the second signaling is received from the serving cell and includes downlink control information (DCI) having a format associated with indicating an SFI associated with the serving cell.

20. The UE of claim 19, wherein the one or more processors are further configured to:
 determine, within the DCI, a location of an SFI field that includes the SFI associated with the serving cell and the SFI associated with the neighboring cell based at least in part on a parameter that indicates, within DCI transmitted by the serving cell, the location of the SFI field that includes the SFI associated with the serving cell.

21. The UE of claim 19, wherein the one or more processors are further configured to:
 determine a parameter that indicates a starting bit position for the SFI associated with the neighboring cell based at least in part on a cell identifier associated with the neighboring cell; and
 determine, within the DCI, a location of an SFI field dedicated to the SFI associated with the neighboring cell based at least in part on the parameter that indicates the starting bit position for the SFI associated with the neighboring cell.

22. The UE of claim 13, wherein the second signaling is received from the neighboring cell and includes downlink control information (DCI) having a format associated with indicating the SFI associated with the neighboring cell.

23. The UE of claim 22, wherein the one or more processors are further configured to:
 receive, from the serving cell, configuration information for the DCI; and
 decode the DCI based at least in part on the configuration information.

24. The UE of claim 23, wherein the configuration information for the DCI includes one or more of a control resource set associated with the DCI, a search space associated with the DCI, a parameter that indicates a location of the SFI associated with the serving cell within the DCI, or a radio network temporary identifier used to scramble the DCI.

25. A non-transitory computer-readable medium storing a set of instructions for wireless communication, the set of instructions comprising:
 one or more instructions that, when executed by one or more processors of a user equipment (UE), cause the UE to:
  receive, from a serving cell, first signaling that indicates one or more time division duplexing (TDD) patterns in use in with a neighboring cell;
  receive second signaling that indicates a slot format indicator (SFI) in use in the neighboring cell; and
  determine a slot configuration allocating transmission time intervals (TTIs) in the neighboring cell to one or more of downlink communication or uplink communication based at least in part on the one or more TDD patterns in use in the neighboring cell and the SFI in use in the neighboring cell.

26. The non-transitory computer-readable medium of claim 25, wherein the second signaling is received from the serving cell and includes downlink control information (DCI) having a format associated with indicating an SFI associated with the serving cell or DCI that is separate from the DCI associated with indicating the SFI associated with the serving cell.

27. The non-transitory computer-readable medium of claim 25, wherein the second signaling is received from the serving cell and includes downlink control information (DCI) having a format associated with indicating the SFI associated with the neighboring cell.

28. An apparatus for wireless communication, comprising:
 means for receiving, from a serving cell, first signaling that indicates one or more time division duplexing (TDD) patterns in use in a neighboring cell;
 means for receiving second signaling that indicates a slot format indicator (SFI) in use in the neighboring cell; and
 means for determining a slot configuration allocating transmission time intervals (TTIs) in the neighboring cell to one or more of downlink communication or uplink communication based at least in part on the one or more TDD patterns in use in the neighboring cell and the SFI in use in the neighboring cell.

29. The apparatus of claim 28, wherein the second signaling is received from the serving cell and includes downlink control information (DCI) having a format associated with indicating an SFI associated with the serving cell or DCI that is separate from the DCI associated with indicating the SFI associated with the serving cell.

30. The apparatus of claim 28, wherein the second signaling is received from the neighboring cell and includes downlink control information (DCI) having a format associated with indicating the SFI associated with the neighboring cell.

* * * * *